United States Patent
Sherony

(10) Patent No.: US 10,232,848 B2
(45) Date of Patent: Mar. 19, 2019

(54) DETECTION OF LEFT TURN ACROSS PATH/OPPOSITE DIRECTION ONCOMING OBJECTS

(71) Applicant: Toyota Motor Engineering & Manufacturing North America, Inc., Erlanger, KY (US)

(72) Inventor: Rini Sherony, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 245 days.

(21) Appl. No.: 15/010,400

(22) Filed: Jan. 29, 2016

(65) Prior Publication Data

US 2017/0217430 A1 Aug. 3, 2017

(51) Int. Cl.
| | | |
|---|---|---|
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 17/00* | (2006.01) | |
| *G06F 19/00* | (2018.01) | |

(Continued)

(52) U.S. Cl.
CPC .......... *B60W 30/09* (2013.01); *B60Q 9/008* (2013.01); *B60W 10/04* (2013.01); *B60W 10/18* (2013.01); *B60W 10/20* (2013.01); *B60W 30/0956* (2013.01); *B60W 2550/20* (2013.01); *B60W 2550/302* (2013.01); *B60W 2550/306* (2013.01); *B60W 2710/18* (2013.01); *B60W 2710/20* (2013.01); *B60W 2720/10* (2013.01)

(58) Field of Classification Search
CPC . B60W 30/09; G01C 21/34; G08G 1/096716; G08G 1/0967; G08G 1/0141
USPC ................ 701/41, 25, 2, 117; 340/905, 903
See application file for complete search history.

(56) References Cited

U.S. PATENT DOCUMENTS

| | | |
|---|---|---|
| 4,638,295 A | 1/1987 | Middlebrook et al. |
| 7,145,441 B2 | 12/2006 | Knoop et al. |
| | (Continued) | |

OTHER PUBLICATIONS

Dabbour et al., "Perceptual Framework for a Modern Left-Turn Collision Warning System", World Academy of Science, Engineering and Technology 33, 2009, pp. 640-646 (7 pages).

(Continued)

*Primary Examiner* — Mahmoud S Ismail
(74) *Attorney, Agent, or Firm* — Christopher G. Darrow; Darrow Mustafa PC

(57) ABSTRACT

A vehicle can be configured to operate relative to oncoming objects. The vehicle can sense to external environment of the vehicle. An oncoming object approaching the vehicle from an opposite direction can be detected. It can be determined whether the oncoming object intends to execute a left turn across the path of the vehicle. Such a determination can be performed in various ways. Responsive to determining that the oncoming object intends to execute a left turn across the path of the vehicle, a driving maneuver to avoid a collision with the oncoming object can be determined. The vehicle can be caused to implement the determined driving maneuver.

20 Claims, 5 Drawing Sheets

(51) Int. Cl.
*B60W 30/09* (2012.01)
*B60W 10/20* (2006.01)
*B60W 10/18* (2012.01)
*B60W 10/04* (2006.01)
*B60W 30/095* (2012.01)
*B60Q 9/00* (2006.01)
*G01C 22/00* (2006.01)
*G05D 3/00* (2006.01)
*G08G 1/09* (2006.01)
*G08G 1/16* (2006.01)

(56) References Cited

U.S. PATENT DOCUMENTS

| | | |
|---|---|---|
| 7,302,325 B2 | 11/2007 | Kudo |
| 2002/0061226 A1 | 5/2002 | Kodama et al. |
| 2004/0210364 A1 | 10/2004 | Kudo |
| 2011/0010046 A1 | 1/2011 | Harada et al. |
| 2011/0102195 A1* | 5/2011 | Kushi ............ G08G 1/096716 340/905 |
| 2013/0166109 A1* | 6/2013 | Ginsberg ............ G08G 1/0967 701/2 |
| 2014/0350790 A1 | 11/2014 | Akesson et al. |
| 2015/0177007 A1* | 6/2015 | Su ......................... G01C 21/34 701/25 |
| 2015/0254977 A1* | 9/2015 | Grabow ............... G08G 1/0141 340/903 |
| 2016/0311323 A1* | 10/2016 | Lee ....................... B60K 37/06 |
| 2017/0236413 A1* | 8/2017 | Takagi ................... B60R 21/00 701/117 |
| 2017/0369052 A1* | 12/2017 | Nagy .................... B60W 30/09 |

OTHER PUBLICATIONS

Smith et al., "An Invariant May Drive the Decision to Encroach at Unsignalized Intersections", Proceedings of the Fifth International Driving Symposium on Human Factors in Driver Assessment, Training and Vehicle Design, Undated, pp. 313-319, (7 pages).

* cited by examiner

DETECTION OF LEFT TURN ACROSS PATH/OPPOSITE DIRECTION ONCOMING OBJECTS

FIELD

The subject matter described herein relates in general to vehicles having an autonomous operational mode and, more particularly, to the operation of such vehicles relative to oncoming objects.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment.

SUMMARY

In one respect, the present disclosure is directed to a method of operating a vehicle relative to oncoming objects approaching the vehicle from an opposite direction. The method detecting an oncoming object approaching the vehicle from an opposite direction. The method also includes determining whether the oncoming object intends to execute a left turn across the path of the vehicle. The method can include, responsive to determining that the oncoming object intends to execute a left turn across the path of the vehicle, determining a driving maneuver to avoid a collision with the oncoming object. The method can further include causing the vehicle to implement the determined driving maneuver.

In another respect, the present disclosure is directed to a system for operating a vehicle relative to oncoming objects approaching the vehicle from an opposite direction. The system can include a sensor system operable to sense an external environment of the vehicle to detect an oncoming object approaching the vehicle from an opposite direction. The system can also include a processor operatively connected to the sensor system. The processor can be programmed to initiate executable operations. The executable operations can include determining whether the oncoming object intends to execute a left turn across the path of the vehicle. The executable operations can include, responsive to determining that the oncoming object intends to execute a left turn across the path of the vehicle, determining a driving maneuver to avoid a collision with the oncoming object. The executable operations can include causing the vehicle to implement the determined driving maneuver.

In yet another respect, the present disclosure is directed to a computer program product for operating a vehicle relative to oncoming objects approaching the vehicle from an opposite direction. The computer program product includes a computer readable storage medium having program code embodied therein. The program code can be executable by a processor to perform a method. The method can include determining whether a detected oncoming object approaching the vehicle from an opposite direction intends to execute a left turn across the path of the vehicle. The method can also include, responsive to determining that the oncoming object intends to execute a left turn across the path of the vehicle, determining a driving maneuver to avoid a collision with the oncoming object. The method can further include causing the vehicle to implement the determined driving maneuver.

DETAILED DESCRIPTION

Figure 1:
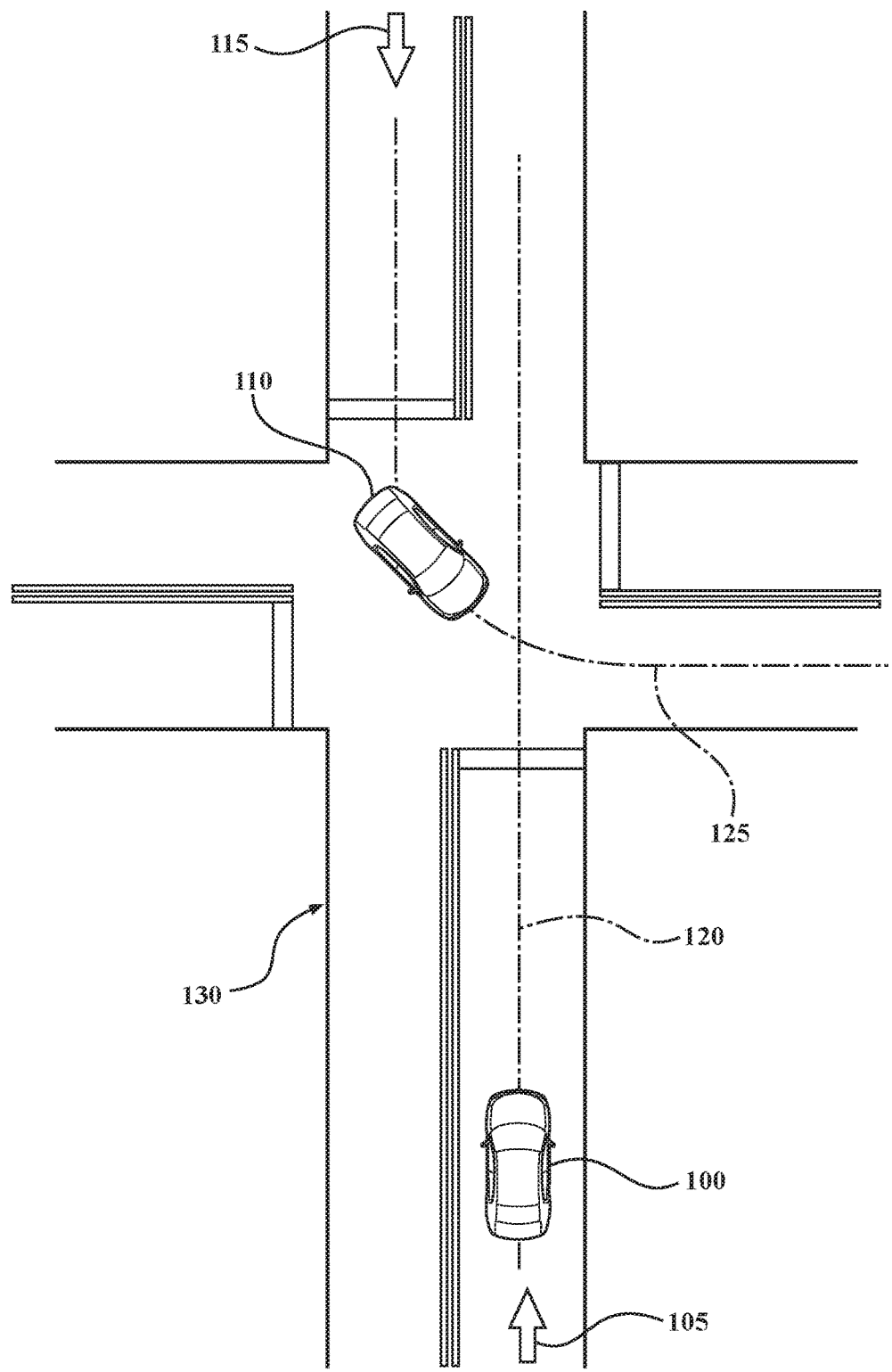
FIG. 1 is an example of a left turn across path/opposite direction scenario.

This detailed description relates to the operation of a vehicle in scenarios in which an oncoming object is approaching the vehicle from an opposite direction and, in particular, a scenario known as left turn across path/opposite direction (LTAP/OD). One example of a LTAP/OD scenario is shown in FIG. 1. A first vehicle 100 is traveling in a first direction 105 on a road 130, and a second vehicle 110 is traveling in a second direction 115 on the road 130. The first vehicle 100 and the second vehicle 110 approach each other from opposite directions. The first vehicle 100 can have an associated first travel path 120 that is substantially straight. The second vehicle 110 can have an associated second travel path 125 that includes a left turn. While the left turn is depicted in FIG. 1 as being a substantially 90 degree left turn, it will be appreciated that left turns at other angles, including angles that are greater than or less than 90 degrees, are included. The second travel path 125 crosses the first travel path 120. Thus, the second travel path 125 includes a left turn across the first travel path 120.

Arrangements described herein are directed to the detection LTAP/OD scenarios by a vehicle. Based on sensor data acquired from an external environment of the vehicle, an oncoming object approaching the vehicle from an opposite direction can be detected. It can be determined whether the oncoming object intends to execute a left turn across the path of the vehicle. If it is determined that the oncoming object intends to execute a left turn across the path of the vehicle, a driving maneuver to avoid a collision with the oncoming object can be determined. The vehicle can be caused to implement the driving maneuver. Alternatively or in addition, an alert can be presented to a driver of the vehicle. The present detailed description relates to systems, methods and computer program products that incorporate one or more of such features. In at least some instances, such systems, methods and computer program products can improve the performance of vehicles and/or the safety of vehicle occupants.

Figure 2:
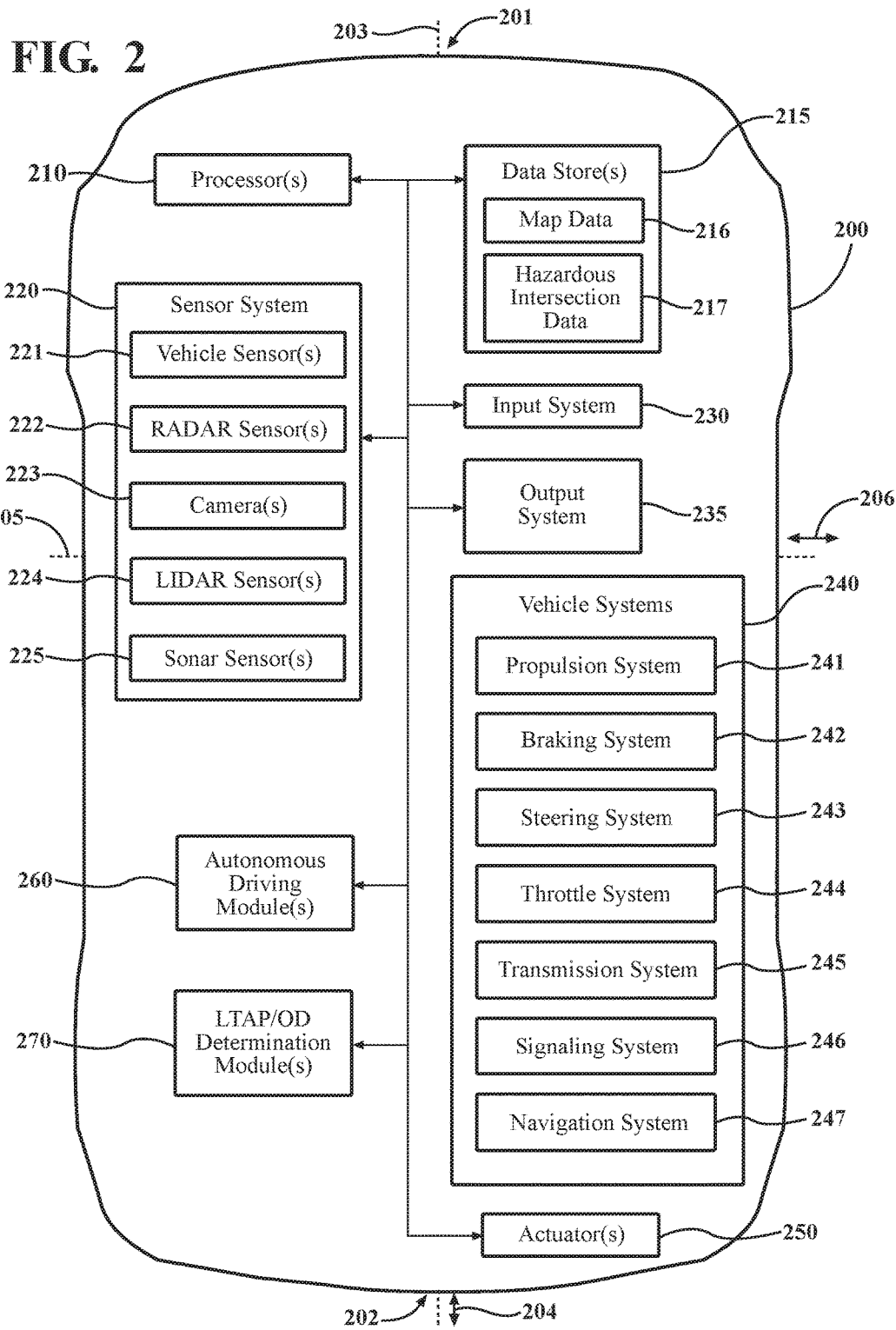
FIG. 2 is an example of a vehicle.

Referring to FIG. 2, an example a vehicle 200 is shown. As used herein, "vehicle" means any form of motorized transport. In one or more implementations, the vehicle 200 can be an automobile. While arrangements will be described herein with respect to automobiles, it will be understood that embodiments are not limited to automobiles. In some implementations, the vehicle 200 may be a watercraft, an aircraft or any other form of motorized transport.

As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 200 can be highly automated or completely automated. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. The vehicle 200 can include a manual mode. "Manual mode" means that all or a majority of the navigation and/or maneuvering of the vehicle along a travel route is performed by a human driver. In some instances, the vehicle 200 can be configured to be selectively switched between different modes.

In some instances, the vehicle 200 may be a conventional vehicle. A conventional vehicle is not configured for autonomous driving. However, in some instances, a conventional vehicle may have one or more semi-autonomous modes or features (e.g., cruise control, adaptive cruise control, lane keeping, etc.). It will be appreciated that arrangements described herein are applicable to autonomous vehicles operating in any of the above-described modes, conventional vehicles, and/or other types of vehicles.

The vehicle 200 can have a forward end 201 and a rearward end 202. The vehicle 200 can have an associated longitudinal axis 203. The vehicle 200 can have an associated longitudinal direction 204. "Longitudinal direction" means any direction that is substantially parallel to and/or co-linear with the longitudinal axis 203. The vehicle 200 can have an associated lateral axis 205, which can be substantially perpendicular to the longitudinal axis 203. As used herein, the term "substantially" includes exactly the term it modifies and slight variations therefrom. The vehicle 200 can have an associated lateral direction 206. "Lateral direction" means any direction that is substantially parallel to and/or co-linear with the lateral axis 205.

The vehicle 200 can include various elements, some of which are shown in FIG. 2. It will be understood that it is not necessary for the vehicle 200 to have all of the elements shown in FIG. 2 or described herein. The vehicle 200 can have additional or fewer elements than those shown in FIG. 2.

The vehicle 200 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other.

The vehicle 200 can include one or more data stores 215 for storing one or more types of data. The data store 215 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operatively connected to the processor(s) 210 for use thereby. The term "operatively connected," as used throughout this description, can include direct or indirect connections, including connections without direct physical contact.

In one or more arrangements, the one or more data stores 215 can include map data 216. The map data 216 can include maps of one or more geographic areas. The map data 216 can include information or data on roads, traffic control devices, road markings, structures, features, and/or landmarks in the one or more geographic areas. The map data 216 can be in any suitable form. In some instances, the map data 216 can include aerial views of an area. In some instances, the map data 216 can include ground views of an area, including 360 degree ground views. The map data 216 can include measurements, dimensions, distances, and/or information for one or more items included in the map data and/or relative to other items included in the map data. The map data 216 can include terrain data. The terrain data can include information about the terrain of one or more geographic areas. The terrain data can include elevation data in the one or more geographic areas. The map data 216 can include a digital map with information about road geometry. The map data 216 can be high quality and/or highly detailed.

In one or more arrangements, the one or more data stores 215 can include hazardous intersection data 217. The hazardous intersection data 217 can include any information relating to accidents that have occurred at or near a particular intersection, portion of a road, and/or area. In some instances, the hazardous intersection data can indicate the type of accidents that have occurred. More particularly, the hazardous intersection data can indicate whether any LTAP/OD-type accidents that have occurred at or near a particular intersection, road, and/or area. Such data can include the number of accidents that have occurred within a certain time frame, the frequency of such accidents, the nature of such accidents, and other related information (e.g., the time of day, weather conditions, road conditions, road construction, etc.).

In some instances, at least a portion of the map data 216 and/or the hazardous intersection data 217 can be located in one or more data stores 215 located onboard the vehicle 200. Alternatively or in addition, at least a portion of the map data 216 and/or the hazardous intersection data 217 can be located in a data store or source that is located remote from the vehicle 200. For instance, at least a portion of the map data 216 and/or the hazardous intersection data 217 can be located on a cloud-based data store or server.

The map data 216 and/or the hazardous intersection data 217 can be obtained by the vehicle 200 in any suitable manner, or it can be provided by an entity (e.g., a vehicle manufacturer, vehicle dealership, etc.) for use by the vehicle 200. In some instances, an entity (e.g., a vehicle dealer, a vehicle manufacturer, a commercial entity, a government entity, etc.) can send or push at least a portion of the map data and/or the hazardous intersection data to the vehicle 200. The map data 216 and/or the hazardous intersection data 217 can be obtained by and/or provided to the vehicle 200 continuously, periodically, irregularly, or even randomly.

The vehicle 200 can include a sensor system 220. The sensor system 220 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process. The sensor system 220 and/or the one or more sensors can be operatively connected to the processor(s) 210, the data store(s) 215, and/or other element of the vehicle 200 (including any of the elements shown in FIG. 2).

The sensor system 220 can include one or more vehicle sensors 221. The vehicle sensor(s) 221 can be configured to detect, determine, assess, monitor, measure, quantify and/or sense information about the vehicle 200 itself. In one or more arrangements, the vehicle sensor(s) 221 can include one or more accelerometers, one or more speedometers, one or more gyroscopes, an inertial measurement unit (IMU), a dead-reckoning system, a global navigation satellite system (GNSS), a global positioning system (GPS), a navigation system 247, and/or other suitable sensors. Alternatively or in addition, the sensor system 220 can include one or more environment sensors configured to acquire, detect, determine, assess, monitor, measure, quantify and/or sense driving environment data. "Driving environment data" includes and data or information about at least a portion of the external environment in which a vehicle is located or one or more portions thereof. The environment sensors can be configured to and/or the driving environment data can be used to detect, determine, assess, monitor, measure, quantify and/or sense, directly or indirectly, the presence of one or more objects in the external environment of the vehicle 200, the position of each detected object relative to the vehicle 200, the speed of each detected object, and/or the movement (past, present, and/or predicted) of each detected object. Various examples of environment sensors will be described herein. However, it will be understood that the embodiments are not limited to the particular sensors described.

As an example, in one or more arrangements, the sensor system 220 can include one or more radar sensors 222. The one or more radar sensors 222, or data obtained thereby, can determine the speed of and/or other information about objects in the external environment of the vehicle 200. Three dimensional coordinate information can be associated with the data acquired by the one or more radar sensors 222.

The sensor system 220 can include can include one or more cameras 223. "Camera" includes any device(s), component(s), and/or system(s) that is configured to capture visual data. "Visual data" includes video and/or image information/data. In one or more arrangements, one or more of the cameras 223 can be oriented, positioned, and/or arranged to capture visual data from at least a portion of the external environment of the vehicle 200.

Alternatively or in addition to one or more of the above examples, the sensor system 220 can include other environment sensors, such as one or more LIDAR sensors 224 and/or one or more sonar sensors 225.

The vehicle 200 can include an input system 230. An "input system" includes any device, component, system, element or arrangement or groups thereof that enable information/data to be entered into a machine. The input system 230 can receive an input from a vehicle occupant (e.g. a driver or a passenger). Any suitable input system 230 can include a keypad, display, button, joystick, microphone, and/or combinations thereof.

The vehicle 200 can include an output system 235. An "output system" includes any device, component, system, element or arrangement or groups thereof that enable information/data to be presented to a vehicle occupant (e.g. a person, a vehicle occupant, etc.). The output system 235 can present information/data to a vehicle occupant. The output system 235 can include a display. Alternatively or in addition, the output system 235 may include a microphone, earphone and/or speaker. Some components of the vehicle 200 may serve as both a component of the input system 230 and a component of the output system 235.

In one or more arrangements described herein, at least a portion of the output system 235 can be activated to provide an alert responsive to determining that an oncoming object intends to execute a left turn across the path of the vehicle 200. The output system 235 can be configured to present an alert to one or more occupants of the vehicle 200. The alert can be any type of alert, including, for example, a visual alert. "Visual alert" is any output that provides information in a manner that is perceptible to the human sense of sight. The visual alert can visually alert a vehicle occupant to the presence of an oncoming object that intends to execute a left turn across the path of the vehicle 200.

The visual alert can be presented by one or more components of the output system 235, such as one or more displays and/or one or more light sources located within in the vehicle 200. A "display" is defined as a component or a group of components that present information/data in visual form, including, for example, video, images, graphics, etc. The visual alert can have any suitable form. In one or more arrangements, the visual alert can be a word, a phrase or a message presented on the display. Alternatively or in addition, the visual alert can be presented by activating one or more light sources. The one or more light sources can generate or emit any type of light energy. The one or more light sources can form and/or be a part of an indicator light or warning light.

Alternatively or in addition being a visual alert, the alert can be an audial alert. "Audial alert" is any output that provides information in a manner that is perceptible to the human sense of hearing. The audial alert can be presented by one or more components of the output system 235, such as by being emitted over one or more speakers or over one or more in-vehicle audio channels. The audial alert can have any suitable form. The audial alert can be a sound, a plurality of sounds, a word, a phrase or a message.

The vehicle 200 can include one or more vehicle systems 240. Various examples of the one or more vehicle systems 240 are shown in FIG. 2. However, the vehicle 200 can include more, fewer, or different vehicle systems. It should be appreciated that although particular vehicle systems are separately defined, each or any of the systems or portions thereof may be otherwise combined or segregated via hardware and/or software within the vehicle 200. The vehicle 200 can include a propulsion system 241, a braking system 242, a steering system 243, throttle system 244, a transmission system 245, a signaling system 246, and/or a navigation system 247. Each of these systems can include one or more mechanisms, devices, elements, components, systems, and/or combination thereof, now known or later developed.

The navigation system 247 can include one or more mechanisms, devices, elements, components, systems, applications and/or combinations thereof, now known or later developed, configured to determine the geographic location of the vehicle 200 and/or to determine a travel route for the vehicle 200. The navigation system 247 can include one or more mapping applications to determine a travel route for the vehicle 200. The navigation system 247 can include a global positioning system, a local positioning system or a geolocation system.

The vehicle 200 can include one or more actuators 250. The actuators 250 can be any element or combination of elements operable to modify, adjust and/or alter one or more of the vehicle systems 240 or components thereof to responsive to receiving signals or other inputs from the processor(s) 210 and/or the autonomous driving module(s) 260. Any suitable actuator can be used. For instance, the one or more actuators 250 can include motors, pneumatic actuators, hydraulic pistons, relays, solenoids, and/or piezoelectric actuators, just to name a few possibilities.

The vehicle 200 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data store 215 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

When the vehicle 200 is an autonomous vehicle, the vehicle 200 can include one or more autonomous driving modules 260. The autonomous driving module(s) 260 can receive data from the sensor system 220 and/or any other type of system capable of capturing information relating to the vehicle 200 and/or the external environment of the vehicle 200. The autonomous driving module(s) 260 can determine position and velocity of the vehicle 200. The autonomous driving module(s) 260 can determine the location of obstacles, objects, or other environmental features including traffic signs, lane markers, trees, shrubs, neighboring vehicles, pedestrians, etc.

The autonomous driving module(s) 260 can be configured to receive, capture, and/or determine location information for objects within the external environment of the vehicle 200 for use by the processor(s) 210, and/or one or more of the modules described herein to estimate position and orientation of the vehicle 200, vehicle position in global coordinates based on signals from a plurality of satellites, or any other data and/or signals that could be used to determine the current state of the vehicle 200 or determine the position of the vehicle 200 in respect to its environment for use in either creating a map or determining the position of the vehicle 200 in respect to map data 216.

The autonomous driving module(s) 260 can be configured to determine travel path(s), current autonomous driving maneuvers for the vehicle 200, future autonomous driving maneuvers and/or modifications to current autonomous driving maneuvers based on data acquired by the sensor system 220, driving scene models, and/or data from any other suitable source. "Driving maneuver" means one or more actions that affect the movement of a vehicle. Examples of driving maneuvers include: accelerating, decelerating, braking, turning, moving in a lateral direction 206 of the vehicle 200, stopping, and/or changing travel lanes.

The autonomous driving module(s) 260 can be configured can be configured to implement determined driving maneuvers. The autonomous driving module(s) 260 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 260 can be configured to execute various vehicle functions and/or to transmit data to, receive data from, interact with, and/or control the vehicle 200 or one or more systems thereof (e.g. one or more of vehicle systems 240).

The vehicle 200 can include one or more left turn across path/opposite direction (LTAP/OD) modules 270. The LTAP/OD module(s) 270 can be configured to analyze, assess, and/or interpret driving environment data to detect oncoming object and/or to determine whether a detected oncoming object intends to turn left across the path of the vehicle 200. The LTAP/OD module(s) 270 can receive data from the sensor system 220, some other system capable of capturing information relating to the vehicle 200 and/or the external environment of the vehicle 200, and/or some other source (e.g., one or more data stores 215, which may be located onboard the vehicle 200 and/or remote from the vehicle 200).

The LTAP/OD module(s) 270 can determine whether a detected oncoming object, which is approaching the vehicle 200 from an opposite direction, intends to turn left across the path of the vehicle 200. Such a determination can be made continuously, periodically, irregularly, or even randomly. The determination of whether a detected oncoming object intends to turn left across the path of the vehicle 200 can be performed in any suitable manner. Various non-limiting examples will now be described.

In one or more arrangements, the vehicle 200 can acquire speed and/or acceleration data about an oncoming object (e.g., a vehicle). If the speed of the oncoming object is below or decreases below a predetermined speed threshold and/or if the oncoming object has a rate of deceleration above a predetermined deceleration threshold, then the LTAP/OD module(s) 270 can determine that the oncoming object intends to turn left across the path of the vehicle 200. Alternatively or in addition, there can be a location aspect to the determination. For instance, if the speed of the oncoming object is or falls below a predetermined threshold and/or if the oncoming object has a rate of deceleration above a predetermined threshold as the oncoming object is located at, near, and/or is approaching a left turn opportunity (as determined using, for example, map data 216), then the LTAP/OD module(s) 270 can determine that the oncoming object intends to turn left across the path of the vehicle 200. However, if the speed of the oncoming object is above or increases above a predetermined speed threshold, then the LTAP/OD module(s) 270 can determine that the oncoming object does not intend to turn left across the path of the vehicle 200. Alternatively or in addition, if the oncoming object has a rate of deceleration below a predetermined threshold or if the oncoming object is not decelerating, then the LTAP/OD module(s) 270 can determine that the oncoming object does not intend to turn left across the path of the vehicle 200.

In another example, the vehicle 200 can analyze visual data, acquired using the sensor system 220 (e.g., the camera(s) 223), to detect whether the oncoming object is signaling a left turn. For instance, the acquired visual data can be analyzed, assesses, and/or processed by the LTAP/OD module(s) 270 and/or the processor(s) 210 to detect whether the left turn signal of an oncoming vehicle is activated. If it is detected that the left turn signal is activated, then the LTAP/OD module(s) 270 can determine that the oncoming vehicle intends to turn left across the path of the vehicle 200. If it is detected that the left turn signal of the oncoming vehicle is not activated, then the LTAP/OD module(s) 270 can determine that the oncoming vehicle does not intend to turn left across the path of the vehicle 200.

In still another example, the vehicle 200 can determine whether the oncoming object intends to turn left across the path of the vehicle 200 based on the location of the oncoming object and/or the vehicle 200. Such a determination can be made in any suitable manner. For instance, the vehicle 200 can acquire location data of the oncoming object, such as by using the sensor system 220. Using the location data of the oncoming object and map data 216, it can be determined whether the oncoming object is located in a left turn lane (e.g., a left turn only lane, a multi-direction turn lane, a center lane, etc.). If the oncoming object is located in a left turn lane, then the LTAP/OD module(s) 270 can determine that the oncoming vehicle intends to turn left across the path of the vehicle 200. However, if the oncoming object is not located in a left turn lane, then the LTAP/OD module(s) 270 can determine that the oncoming vehicle does not intend to turn left across the path of the vehicle 200.

In still another example of a location-based determination whether the oncoming object intends to turn left across the path of the vehicle 200, the vehicle 200 can determine whether the oncoming object and/or the vehicle 200 are located at, near, or approaching a hazardous intersection, road, or area. For instance, the vehicle 200 can acquire location data of the oncoming vehicle, such as by using the sensor system 220, and/or location data of the vehicle. Using the acquired location data, the map data 216 and/or the hazardous intersection data 217, it can be determined whether the oncoming object and/or the vehicle 200 is located in, near, and/or approaching a hazardous intersection. If the vehicle 200 and/or the oncoming object is located in, near, and/or approaching a hazardous intersection, then the LTAP/OD module(s) 270 can determine that the oncoming object intends to turn left across the path of the vehicle 200. Such a determination can be made regardless of whether the oncoming object actually intends to turn left across the path of the vehicle 200. Further, the vehicle 200 can operate conservatively with respect to an oncoming object in such areas. If the vehicle 200 and/or the oncoming object is not located in, near, and/or approaching a hazardous intersection, then the LTAP/OD module(s) 270 can determine that the oncoming object does not intend to turn left across the path of the vehicle 200.

The LTAP/OD module(s) 270 can be configured to present a warning or an alert or cause a warning or an alert to be presented as to the presence of oncoming objects that are determined as intending to turn left across the path of the vehicle 200. The LTAP/OD module(s) 270 can cause any suitable type of warning or alert to be presented, such as a visual alert or an audial alert.

The LTAP/OD module(s) 270 can be configured to determine one or more driving maneuvers for the vehicle 200 to avoid collisions with the oncoming object and/or reduce the likelihood of a collision with the oncoming object. The determination of one or more driving maneuvers can be made in any suitable manner. For instance, the LTAP/OD module(s) 270 can make such a determination based on one or more factors. Such factors can include the actual or predicted position and/or movement of the oncoming object and/or the vehicle 200, the presence of other vehicles, traffic laws, etc., just to name a few possibilities.

The LTAP/OD module(s) 270, the autonomous driving module(s) 260, and/or the processor(s) 210 can cause, directly or indirectly, such autonomous driving maneuvers to be implemented. The LTAP/OD module(s) 270, the autonomous driving module(s) 260, and/or the processor(s) 210 can be configured to execute various vehicle functions and/or to transmit data to, receive data from, interact with, and/or control the vehicle 200 or one or more systems thereof (e.g. one or more of vehicle systems 240).

The LTAP/OD module(s) 270 can be configured to determine or predict whether a detected LTAP/OD will collide with the vehicle 200. Various factors can be used in such a determination, including, for example, one or more of the following: speed of the vehicle 200, travel route of the vehicle 200, the current location of the vehicle 200, the current location of the LTAP/OD object, the location of the detected LTAP/OD object relative to the vehicle 200, past movement(s) of the detected LTAP/OD object, predicted future movements of the LTAP/OD object, speed of the LTAP/OD object. The LTAP/OD module(s) 270 can be configured to determine or predict whether a collision between the LTAP/OD object and the vehicle 200 is avoidable or unavoidable. Such a determination may consider one or more factors, including, for example, one or more of the following: the location of other objects in the driving environment, road conditions, road markings, traffic rules, etc.

Responsive to determining that a collision between the LTAP/OD object and the vehicle 200 is unavoidable, the LTAP/OD module(s) 270 can be configured to determine a collision mitigating maneuver for the vehicle 200. A "collision mitigating maneuver" is any maneuver that can protect one or more occupants of a vehicle and/or to minimize damage to the vehicle 200. In one or more arrangements, determining the collision mitigating maneuver for the vehicle 200 can be based at least partially on a characteristic of a particular area of the vehicle 200. For instance, the driving maneuver can include positioning the vehicle 200 so that the object can collide with the vehicle 200 in a more impact resistant area of the vehicle 200.

The processor(s) 210 and/or one or more of the modules 260, 270 can be operatively connected to communicate with the various vehicle systems 240 and/or individual components thereof. For example, the processor(s) 210 and/or one or more of the modules 260, 270 can be in communication to send and/or receive information from the various vehicle systems 240 to control the movement, speed, maneuvering, heading, direction, etc. of vehicle 200. The processor(s) 210 and/or the autonomous driving module(s) 260 may control some or all of these vehicle systems 240 and, thus, may be partially or fully autonomous.

The processor(s) 210 and/or one or more of the modules 260, 270 can be operatively connected to communicate with the various vehicle systems 140 and/or individual components thereof. For example, returning to FIG. 1, the processor(s) 210 and/or one or more of the modules 260, 270 can be in communication to send and/or receive information from the various vehicle systems 240 to control the movement, speed, maneuvering, heading, direction, etc. of the vehicle 200. The processor(s) 210 and/or one or more of the modules 260, 270 may control some or all of these vehicle systems 240.

The processor(s) 210 and/or one or more of the modules 260, 270 may be operable to control the navigation and/or maneuvering of the vehicle 200 by controlling one or more of the vehicle systems 240 and/or components thereof. For instance, when operating in an autonomous mode, the processor(s) 210 and/or one or more of the modules 260, 270 can control the direction and/or speed of the vehicle 200. The processor(s) 210 and/or one or more of the modules 260, 270 can cause the vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels).

According to arrangements described herein, the vehicle 200 can be configured to operate relative to oncoming objects approaching the vehicle from an opposite direction. In one or more arrangements, the vehicle 200 can be configured to determine whether the oncoming object intends to execute a left turn across the path of the vehicle 200. The vehicle 200 can be configured to determine and implement appropriate driving maneuvers based on the presence of such objects.

Figure 3:
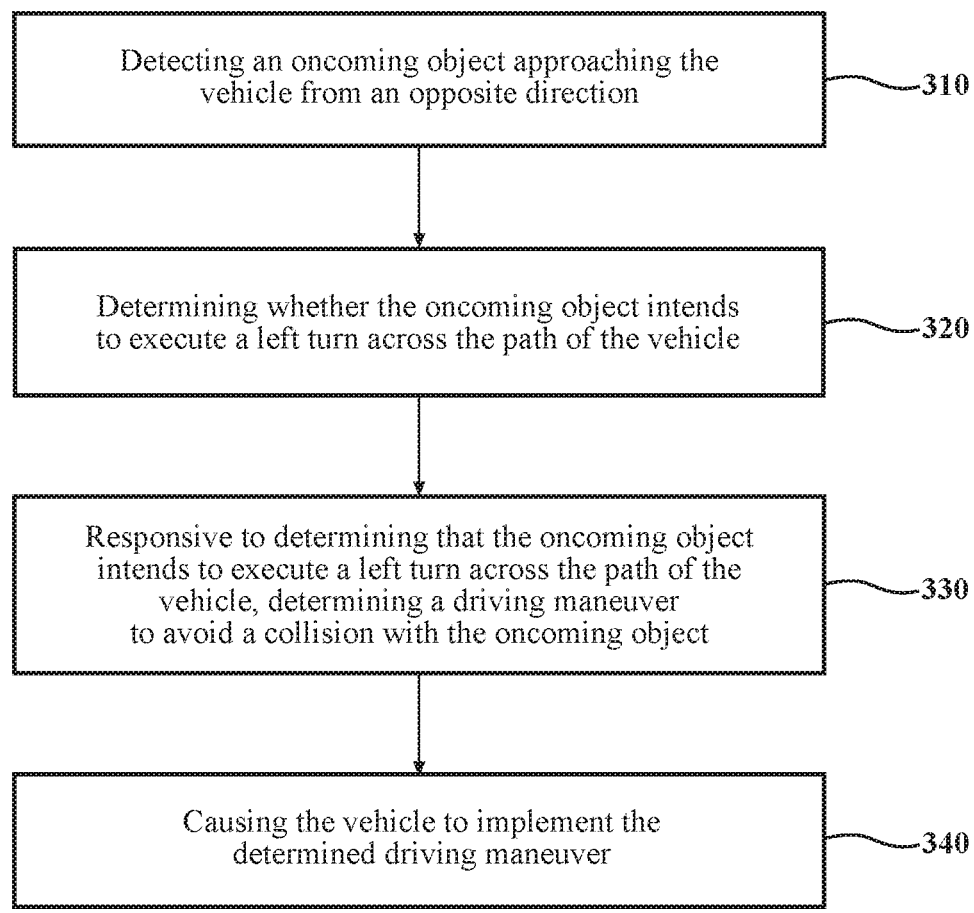
FIG. 3 is an example of a method of operating a vehicle relative to oncoming objects approaching the vehicle from an opposite direction.

Referring now to FIG. 3, an example of a method of operating a vehicle relative to oncoming objects approaching the vehicle from an opposite direction is shown. Various possible steps of method 300 will now be described. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

At block 310, the external environment of the vehicle 200 can be sensed to detect whether an oncoming object approaching the vehicle from an opposite direction. In one or more arrangements, the sensing of the external environment can be performed by one or more sensors of the sensor system 220 (e.g., the RADAR sensor(s) 222, the camera(s) 223, and/or the LIDAR sensor(s) 224). Based on the information acquired by the sensor system 220, one or more elements of the vehicle 200 (e.g., the LTAP/OD module(s) 270) can detect whether there is an oncoming object approaching the vehicle from an opposite direction. "Oncoming object" means an object located forward of the vehicle in the longitudinal direction of the vehicle. "Opposite direction" means substantially opposite to the direction of travel of the vehicle. The detecting of the external environment of the vehicle 200 can be performed continuously, periodically or at any suitable interval, irregularly, or even randomly. If an oncoming object is detected, the method 300 can continue to block 320. If no oncoming objects are detected in the external environment, the method 300 can return to block 310, or the method 300 can end.

At block 320, it can be determined whether the detected oncoming object intends to execute a left turn across the path of the vehicle 200. Such a determination can be performed by, for example, the LTAP/OD module(s) 270 and/or the processor(s) 210. If it is determined that the oncoming object does not intend to execute a left turn across the path of the vehicle 200, the method 300 can return to block 310, or the method 300 can end. If it is determined that the oncoming object intends to execute a left turn across the path of the vehicle 200, the method 300 can continue to block 330.

At block 330, responsive to determining that the oncoming object intends to execute a left turn across the path of the vehicle 200, a driving maneuver for the vehicle 200 can be determined to avoid collision or minimize/reduce the risk of collision with the oncoming object. Such a determination can be performed by, for example, by the LTAP/OD module(s) 270, the autonomous driving module(s) 260, and/or the processor(s) 210. The method 300 can continue to block 340.

At block 340, the vehicle 200 can be caused to implement the determined driving maneuver. Such causing can be performed by the LTAP/OD module(s) 270, the autonomous driving module(s) 260, and/or the processor(s) 210. The autonomous driving module(s) 260, and/or the processor(s) 210 can be operatively connected to one or more of the vehicle systems 240 to implement the determined driving maneuver. In one or more arrangements, the autonomous driving module(s) 260, and/or the processor(s) 210 can be configured to control the one or more actuators 250, which can control one or more of the vehicle systems 240 or portions thereof to implement the determined driving maneuver.

When the determined driving maneuver is implemented, the method 300 can end. Alternatively, the method 300 can return to block 310. In some instances, once the oncoming object has completed its left turn across the path of the vehicle 200 and/or the vehicle 200 has otherwise passed the oncoming object, the vehicle 200 can return to the travel route/driving maneuver that was being implemented prior to the implementation of the determined driving maneuver, the determined driving maneuver can be discontinued, or the determined driving maneuver can be continued.

As a further alternative, the method 300 can include additional and/or alternative blocks (not shown). For instance, a driver or other occupant of the vehicle 200 can be alerted or warned of an oncoming object that intends to execute a left turn across the path of the vehicle 200. For instance, a visual alert, an audial alert, and/or a haptic alert can be provided to a vehicle occupant. In one or more arrangements, the driver or other occupant of the vehicle 200 can be prompted to provide permission to implement the determined driving maneuver. If an input is received granting permission, the determined driving maneuver can be implemented. If an input is received denying permission, then the vehicle 200 can take any suitable action, such as presenting a warning, switching to manual operation, determining a different driving maneuver or a system default action.

An example of the operation of the vehicle in accordance with the method 300 will now be described in relation to FIG. 4. For purposes of this example, the vehicle 200 can be traveling in an environment 400 on a first road 405. The first road 405 can include a first travel lane 410 and a second travel lane 412. Vehicles can move in a first direction 411 in the first travel lane 410, and vehicles can move in a second direction 413 in the second travel lane 412.

A second road 420 can cross the first road 405 to form an intersection 430. Information about the first road 405, the second road 420, and/or the intersection 430 can be included in map data 216 and/or the hazardous intersection data 217. While FIG. 4 shows an environment in which there is an intersection, it will be understood that arrangements described herein can be implemented even if there is not an intersection between two roads.

Figure 4:
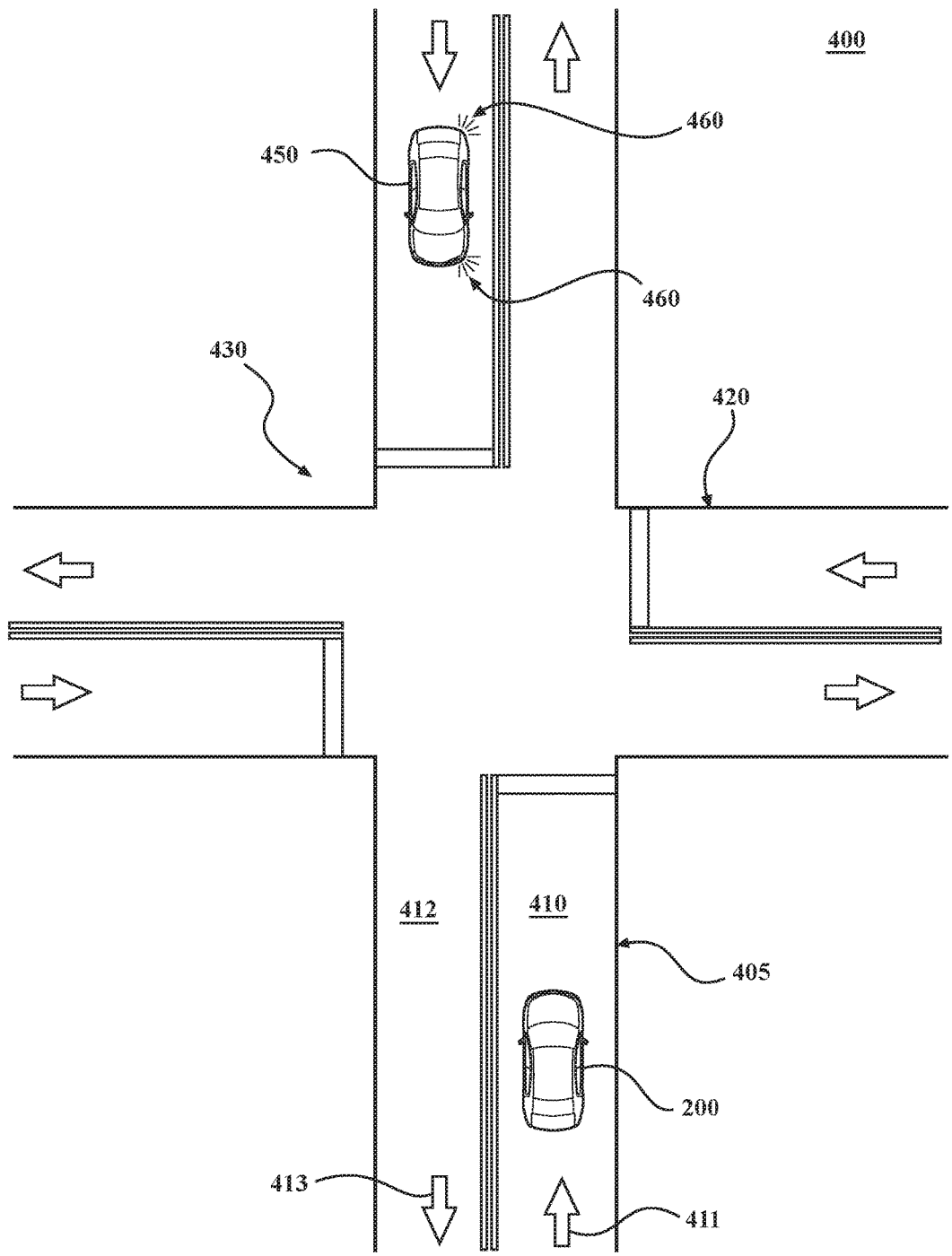
FIG. 4 is a scenario in which an oncoming object is approaching a vehicle from an opposite direction, wherein the oncoming object is a vehicle with an activated left turn signal.

In FIG. 4, the current travel lane of the vehicle 200 can be the first travel lane 410. The vehicle 200 can detect the environment 400, such as by using one or more sensors of the sensor system 220. The vehicle 200 can detect the presence of oncoming objects (e.g. oncoming vehicle 450 in the second travel lane 412) in the environment 400.

The vehicle 200 can determine whether the detected oncoming vehicle 450 intends to execute a left turn across the path of the vehicle 200. In this example, the oncoming vehicle 450 would turn left onto a travel lane of the second road 420. Such a determination can be performed by one or more elements of the vehicle 200. For instance, such a determination can be performed by the LTAP/OD module(s) 270 and/or the processor(s) 210.

In one example, the LTAP/OD module(s) 270 can detect the use of left turn signals of the oncoming vehicle 450 based on visual data acquired by the sensor system 220 (e.g., the camera(s) 223). If one or more activated left turn signals 460 of the oncoming vehicle 450 are detected in the acquired visual data or otherwise, then the LTAP/OD module(s) 270 can determine that the oncoming vehicle 450 intends to turn left across the path of the vehicle 200.

Alternatively or in addition to the above, the vehicle 200 can acquire speed data about the oncoming vehicle 450. If the speed of the oncoming vehicle 450 is below a predetermined threshold or if the oncoming vehicle 450 has a rate of decelerating above a predetermined threshold, then it can be determined that the oncoming vehicle 450 intends to turn left across the path of the vehicle 200.

Still alternatively or in addition, the LTAP/OD module(s) 270 can determine that the vehicle 200 and/or the oncoming vehicle 450 are located at, near, and/or approaching a hazardous intersection, such as, for example, based on hazardous intersection data 217. If the vehicle 200 and/or the oncoming object is located in or is approaching a hazardous intersection, then it can be determined that the oncoming vehicle 450 intends to turn left across the path of the vehicle 200.

Responsive to determining that the oncoming vehicle 450 intends to execute a left turn across the path of the vehicle 200, a driving maneuver for the vehicle 200 can be determined to avoid a collision with the oncoming vehicle 450 or to mitigate the risk of a collision. The determination of a driving maneuver can be performed by one or more elements of the vehicle 200. For instance, such a determination can be performed by the LTAP/OD module(s) 270, the autonomous driving module(s) 260, and/or the processor(s) 210. The driving maneuver can be any suitable driving maneuver. For instance, the driving maneuver can be decelerating or otherwise reducing the speed of the vehicle 200. As an example, the vehicle 200 can reduce its speed to allow the oncoming vehicle 450 to complete the left turn before the vehicle 200 reaches the intersection 430 and/or to allow the vehicle 200 to potentially activate the braking system 242 less sharply if the oncoming vehicle 450 attempts to make a left turn. Alternatively or in addition, the driving maneuver can include moving the vehicle 200 away from the oncoming vehicle 450 substantially in the lateral direction 206 (FIG. 2).

The vehicle 200 can be caused to implement the determined driving maneuver. Such causing can be performed by one or more elements of the vehicle 200, such as the LTAP/OD module(s) 270, the autonomous driving module(s) 260, and/or the processor(s) 210. For instance, such as by the processor(s) 210, the autonomous driving module(s) 260 and/or the actuators 250. Such causing can be performed automatically or in response to an input or command.

Figure 5:
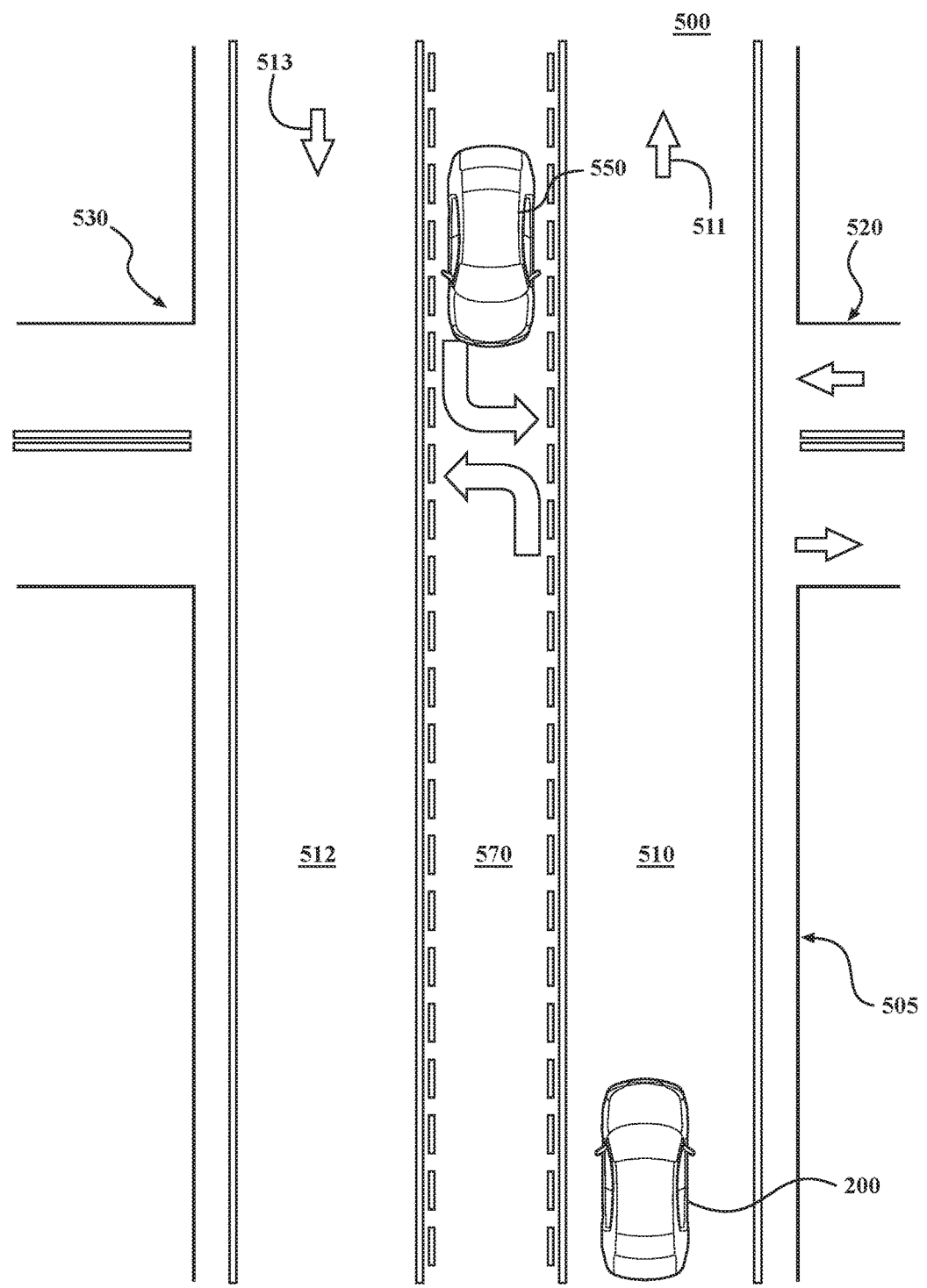
FIG. 5 is a scenario in which an oncoming object is approaching a vehicle from an opposite direction, wherein the oncoming object is a vehicle located in a center turn lane.

Another non-limiting example of the operation of the vehicle 200 in accordance with the method 300 will now be described in relation to FIG. 5. For purposes of this example, the vehicle 200 and an oncoming vehicle 550 can be traveling in an environment 500 on a first road 505. There can be a second road 520 that is transverse to the first road 505. The second road 520 can cross the first road 505 to form an intersection 530. Information about the first road 505, the second road 520, and/or the intersection 530 can be included in the map data 216.

The vehicle 200 can be traveling in a first direction 511 in a first travel lane 510, and the oncoming vehicle 550 can be traveling in a second direction 513 in a second travel lane 512. The first direction 511 can be substantially opposite to the second direction 513, as is shown in FIG. 5. It should be noted that the above description of like items (first road, second road, intersection, travel lanes, etc.) in FIG. 4 applies equally to FIG. 5.

The first road 505 can include a center lane 570 located between the first travel lane 510 and the second travel lane 512. The oncoming vehicle 550 can move into the center lane 570 from the second travel lane 512. In this example, and the oncoming vehicle 550 can be traveling in a second direction 513 in a second travel lane 512. At the instant shown in FIG. 5, the oncoming vehicle 550 may be traveling in the second direction 513 within the center lane 570. Alternatively, the oncoming vehicle 550 may be stopped in the center lane 570 awaiting an opportunity to turn left onto the second road 520.

The vehicle 200 can detect the environment 500, such as by using one or more sensors of the sensor system 220. The vehicle 200 can detect the presence of one or more oncoming objects (e.g. the oncoming vehicle 550 in the center lane 570) in the environment 500. The vehicle 200 can determine whether the detected oncoming vehicle 550 intends to execute a left turn across the path of the vehicle 200. Such a determination can be performed by one or more elements of the vehicle 200. For instance, such a determination can be performed by the LTAP/OD module(s) 270 and/or the processor(s) 210.

In this example, the vehicle 200 can determine whether the oncoming object intends to turn left across the path of the vehicle 200 based on the location of the oncoming object and/or the vehicle 200. For instance, the vehicle 200 can acquire location data of the oncoming vehicle 550, such as by using the sensor system 220. Using the location data of the oncoming vehicle 550 and map data 216, it can be determined whether the oncoming vehicle 550 is located in a left turn lane (e.g., a left turn only lane, a multi-direction turn lane, a center lane, etc.). Here, the oncoming vehicle 550 is located in a center lane 570. Thus, the LTAP/OD module(s) 270 can determine that the oncoming vehicle intends to turn left across the path of the vehicle 200. Responsive to such a determination, a driving maneuver for the vehicle 200 can be determined to avoid collision with the oncoming vehicle 550 or mitigate the risk of such a collision. The determination of a driving maneuver can be performed by one or more elements of the vehicle 200. For instance, such a determination can be performed by the LTAP/OD module(s) 270, the autonomous driving module(s) 260, and/or the processor(s) 210.

The vehicle 200 can be caused to implement the determined driving maneuver. Such causing can be performed by one or more elements of the vehicle 200, such as the LTAP/OD module(s) 270, the autonomous driving module(s) 260, and/or the processor(s) 210. For instance, such as by the processor(s) 210, the autonomous driving module(s) 260 and/or the actuators 250. Such causing can be performed automatically or in response to an input or command.

It will be appreciated that arrangements described herein can provide numerous benefits, including one or more of the benefits mentioned herein. For example, arrangements described herein can improve the performance of a vehicle. Arrangements described herein can allow for the detection and/or determination of whether an oncoming object intends to turn left across the path of the vehicle, one of the most difficult driving situations to detect. Arrangements described herein can improve safety for vehicles. Arrangements described herein can prevent and/or mitigate risk with respect to oncoming objects intending to turn left across the path of the vehicle. Arrangements described herein can potentially prevent or mitigate crashes from LTAP/OD scenarios. Further, arrangements described herein can provide for greater flexibility in the operation of the vehicle while maintaining safety for the vehicle, occupants of the vehicle, oncoming objects and other objects in the external environment of the vehicle.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages. The program code may execute entirely on the user's computer, partly on the user's computer, as a stand-alone software package, partly on the user's computer and partly on a remote computer, or entirely on the remote computer or server.

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating a vehicle relative to oncoming objects approaching the vehicle from an opposite direction, the method comprising:
    detecting an oncoming object approaching the vehicle from an opposite direction;
    determining whether the oncoming object intends to execute a left turn across a travel path of the vehicle, the determining including:
        determining whether the oncoming object is decelerating above a predetermined deceleration rate; and
        responsive to determining that the oncoming object is decelerating above the predetermined deceleration rate, determining that the oncoming object intends to execute a left turn across the travel path of the vehicle;
    responsive to determining that the oncoming object intends to execute a left turn across the travel path of the vehicle, determining a driving maneuver to avoid a collision with the oncoming object; and
    causing the vehicle to implement the determined driving maneuver.

2. A method of operating a vehicle relative to oncoming objects approaching the vehicle from an opposite direction, the method comprising:
    detecting an oncoming object approaching the vehicle from an opposite direction;
    determining whether the oncoming object intends to execute a left turn across a travel path of the vehicle, the determining including:
        determining, using one or more maps that include left turn lane data, whether the oncoming object is located in or has entered a dedicated left turn lane; and
        responsive to determining that the oncoming object is located in or has entered a dedicated left turn lane, determining that the oncoming object intends to execute a left turn across the travel path of the vehicle;
    responsive to determining that the oncoming object intends to execute a left turn across the travel path of the vehicle, determining a driving maneuver to avoid a collision with the oncoming object; and causing the vehicle to implement the determined driving maneuver.

3. A method of operating a vehicle relative to oncoming objects approaching the vehicle from an opposite direction, the method comprising:
   detecting an oncoming object approaching the vehicle from an opposite direction;
   determining whether the oncoming object intends to execute a left turn across a travel path of the vehicle, the determining including:
      determining whether the oncoming object is located in a hazardous intersection or is approaching a hazardous intersection; and
      responsive to determining that the oncoming object is located in a hazardous intersection or is approaching a hazardous intersection, determining that the oncoming object intends to execute a left turn across the travel path of the vehicle;
   responsive to determining that the oncoming object intends to execute a left turn across the travel path of the vehicle, determining a driving maneuver to avoid a collision with the oncoming object; and
   causing the vehicle to implement the determined driving maneuver.

4. The method of claim 1, wherein the driving maneuver includes moving the vehicle in a lateral direction.

5. The method of claim 1, wherein the driving maneuver includes decreasing the speed of the vehicle.

6. The method of claim 1, further including: responsive to determining that the oncoming object does not intend to execute a left turn across the travel path of the vehicle, maintaining a current speed of the vehicle.

7. The method of claim 1, further including: responsive to determining that the oncoming object intends to execute a left turn across the travel path of the vehicle, presenting an alert to a driver of the vehicle.

8. A system for operating a vehicle relative to oncoming objects approaching the vehicle from an opposite direction, the system comprising:
   a sensor system operable to sense an external environment of the vehicle to detect an oncoming object approaching the vehicle from an opposite direction, the sensor system including one or more radar sensors;
   a processor operatively connected to the sensor system, the processor being programmed to initiate executable operations comprising:
      determining whether the oncoming object intends to execute a left turn across a travel path of the vehicle, the determining including:
         determining whether the oncoming object is decelerating above a predetermined deceleration rate based on data acquired by the one or more radar sensors; and
         responsive to determining that the oncoming object is decelerating above the predetermined deceleration rate, determining that the oncoming object intends to execute a left turn across the travel path of the vehicle;
      responsive to determining that the oncoming object intends to execute a left turn across the travel path of the vehicle, determining a driving maneuver to avoid a collision with the oncoming object; and
      causing the vehicle to implement the determined driving maneuver.

9. A system for operating a vehicle relative to oncoming objects approaching the vehicle from an opposite direction, the system comprising:
   a sensor system operable to sense an external environment of the vehicle to detect an oncoming object approaching the vehicle from an opposite direction;
   one or more data stores, the one or more data stores including one or more maps, the one or more maps including left turn lane data;
   a processor operatively connected to the sensor system and to the one or more data stores, the processor being programmed to initiate executable operations comprising:
      determining whether the oncoming object intends to execute a left turn across a travel path of the vehicle, the determining including:
         determining a current position of the oncoming object;
         locating the current position of the oncoming object on one or more of the one or more maps;
         determining, using the one or more of the one or more maps, whether the oncoming object is located in or has entered a dedicated left turn lane; and
         responsive to determining that the oncoming object is located in or has entered a dedicated left turn lane, determining that the oncoming object intends to execute a left turn across the travel path of the vehicle;
      responsive to determining that the oncoming object intends to execute a left turn across the travel path of the vehicle, determining a driving maneuver to avoid a collision with the oncoming object; and
      responsive to receiving permission to implement the determined driving maneuver, causing the vehicle to implement the determined driving maneuver.

10. A system for operating a vehicle relative to oncoming objects approaching the vehicle from an opposite direction, the system comprising:
    a sensor system operable to sense an external environment of the vehicle to detect an oncoming object approaching the vehicle from an opposite direction;
    a processor operatively connected to the sensor system, the processor being programmed to initiate executable operations comprising:
       determining whether the oncoming object intends to execute a left turn across a travel path of the vehicle, the determining including:
          determining whether the oncoming object is located in a hazardous intersection or is approaching a hazardous intersection; and
          responsive to determining that the oncoming object is located in a hazardous intersection or is approaching a hazardous intersection, determining that the oncoming object intends to execute a left turn across the travel path of the vehicle; and
       responsive to determining that the oncoming object intends to execute a left turn across the travel path of the vehicle, determining a driving maneuver to avoid a collision with the oncoming object; and
       causing the vehicle to implement the determined driving maneuver.

11. The system of claim 8, wherein the driving maneuver includes moving the vehicle in a lateral direction.

12. The system of claim 8, wherein the driving maneuver includes decreasing the speed of the vehicle.

13. The system of claim 8, wherein the executable operations further include: responsive to determining that the oncoming object intends to execute a left turn across the travel path of the vehicle, presenting an alert to a driver of the vehicle.

14. A computer program product for operating a vehicle relative to oncoming objects approaching the vehicle from an opposite direction, the computer program product comprising a non-transitory computer readable storage medium having program code embodied therein, the program code executable by a processor to perform a method comprising:
  determining whether a detected oncoming object approaching the vehicle from an opposite direction intends to execute a left turn across a travel path of the vehicle, the determining including:
    determining whether the detected oncoming object is decelerating above a predetermined deceleration rate; and
    responsive to determining that the detected oncoming object is decelerating above the predetermined deceleration rate, determining that the detected oncoming object intends to execute a left turn across the travel path of the vehicle;
  responsive to determining that the detected oncoming object intends to execute a left turn across the travel path of the vehicle, determining a driving maneuver to avoid a collision with the detected oncoming object; and
  causing the vehicle to implement the determined driving maneuver.

15. The method of claim 1, further including: prompting an occupant of the vehicle for permission to implement the determined driving maneuver, wherein causing the vehicle to implement the determined driving maneuver is performed responsive to receiving an input from the occupant of the vehicle indicating permission to implement the determined driving maneuver.

16. The system of claim 8, wherein the executable operations further include: prompting an occupant of the vehicle for permission to implement the determined driving maneuver, wherein causing the vehicle to implement the determined driving maneuver is performed responsive to receiving permission to implement the determined driving maneuver from the occupant.

17. The method of claim 2, wherein the driving maneuver includes moving the vehicle in a lateral direction or decreasing the speed of the vehicle.

18. The method of claim 3, wherein the driving maneuver includes moving the vehicle in a lateral direction or decreasing the speed of the vehicle.

19. The system of claim 9, wherein the driving maneuver includes moving the vehicle in a lateral direction or decreasing the speed of the vehicle.

20. The system of claim 10, wherein the driving maneuver includes moving the vehicle in a lateral direction or decreasing the speed of the vehicle.

* * * * *